April 25, 1961 E. R. PIERCE 2,981,371
COMBINED VARIABLE DISPLACEMENT PUMPING MECHANISM
Filed April 28, 1955 3 Sheets-Sheet 1

INVENTOR
Earl R. Pierce
BY
J. C. Thorpe
ATTORNEY

April 25, 1961 E. R. PIERCE 2,981,371
COMBINED VARIABLE DISPLACEMENT PUMPING MECHANISM
Filed April 28, 1955 3 Sheets-Sheet 2

INVENTOR
Earl R. Pierce
BY J. C. Thorpe
ATTORNEY

United States Patent Office 2,981,371
Patented Apr. 25, 1961

2,981,371
COMBINED VARIABLE DISPLACEMENT PUMPING MECHANISM

Earl R. Pierce, Birmingham, Mich., assignor to General Motors Corporation, Detroit, Mich., a corporation of Delaware Filed Apr. 28, 1955, Ser. No. 504,527

16 Claims. (Cl. 184—6)

This invention relates to a hydraulic pumping mechanism and has for one of its principal objects to provide a hydraulic pumping mechanism comprising at least two companion variable displacement pumping units with means responsive to the output of one of said units for varying the displacement of each such pumping units in a substantially fixed ratio with respect to the other pumping units.

The invention has particular application to the lubrication system of an internal combustion engine of the so-called dry-sump type in which an engine-driven pump draws lubricating oil from a supply reservoir and pumps it under pressure to the engine parts to be lubricated and cooled thereby, and from which parts the oil drains into a sump from which another engine-driven pumping unit returns the oil to the reservoir. However, its use is not limited to applications of this particular nature and is considered adaptable to applications requiring multiple variable displacement pumps generally.

In engine lubricating applications, the datum of oil required for proper lubrication is principally a function of engine speed. It is, therefore, desirable to regulate the discharge of the lubricant-supplying pump in accordance with engine demand to limit the lubricating pressure and the power utilized by the lubricant pump and to prevent excessive foaming of the oil which is a by-product of excessive lubricating pressure and starvation of the pump at certain speeds. In hydraulic pumping mechanisms utilized in conjunction with a dry-sump engine, it is similarly desirable to regulate the output of the dry-sump-scavenging pump unit in accordance with engine demand since the scavenging unit must return the lubricant collecting in the sump to the reservoir. Since the oil delivered to the various parts of an internal combustion engine for lubrication and cooling becomes aerated with a resultant increase in volume, the dry-sump-scavenging pumping unit must necessarily be provided with a capacity substantially greater than the capacity of the pressure-supplying pumping unit at all engine speeds to insure the removal of the oil as it accumulates in the sump under all pump operating conditions.

It is thus another principal object of the invention to provide a combined pumping mechanism for a dry-sump engine including two commonly driven variable displacement pumps of differing capacities with displacement varying means for each pump responsive to their driven speed for adjusting the pumping capacity of each pump in a substantially fixed ratio with respect to the adjusted capacity of the other pump.

The foregoing objects are obtained by providing a hydraulic pumping mechanism featuring, in combination, a plurality of variable displacement vane-type rotary pumps arranged in juxtaposition within a common casing, each of said pumps including a rotor body, an outer barrel or cylinder movable transversely of the rotor to vary the displacement of the pump, a plurality of vanes reciprocably mounted in the rotor body and working against said barrel and dividing each pump unit into a plurality of expansible pumping compartments, a shaft common to the various pump units and adapted to drive said rotors, resilient means normally biasing the cylinder or barrel toward its maximum displacement position, and piston means responsive to the discharge pressure of one of said pumps for adjusting the eccentricity of each of said barrels with respect to the axis of the rotor body in opposition to the resilient biasing means thereby varying the pumping capacity of each unit in a fixed ratio with respect to the other units and in accordance with the lubricant or fluid demands of the associated engine or pressure system.

The foregoing and other objects and features of the invention will be more thoroughly understood from a detailed description of one embodiment thereof as shown by the accompanying drawings, in which.

Figure 1:
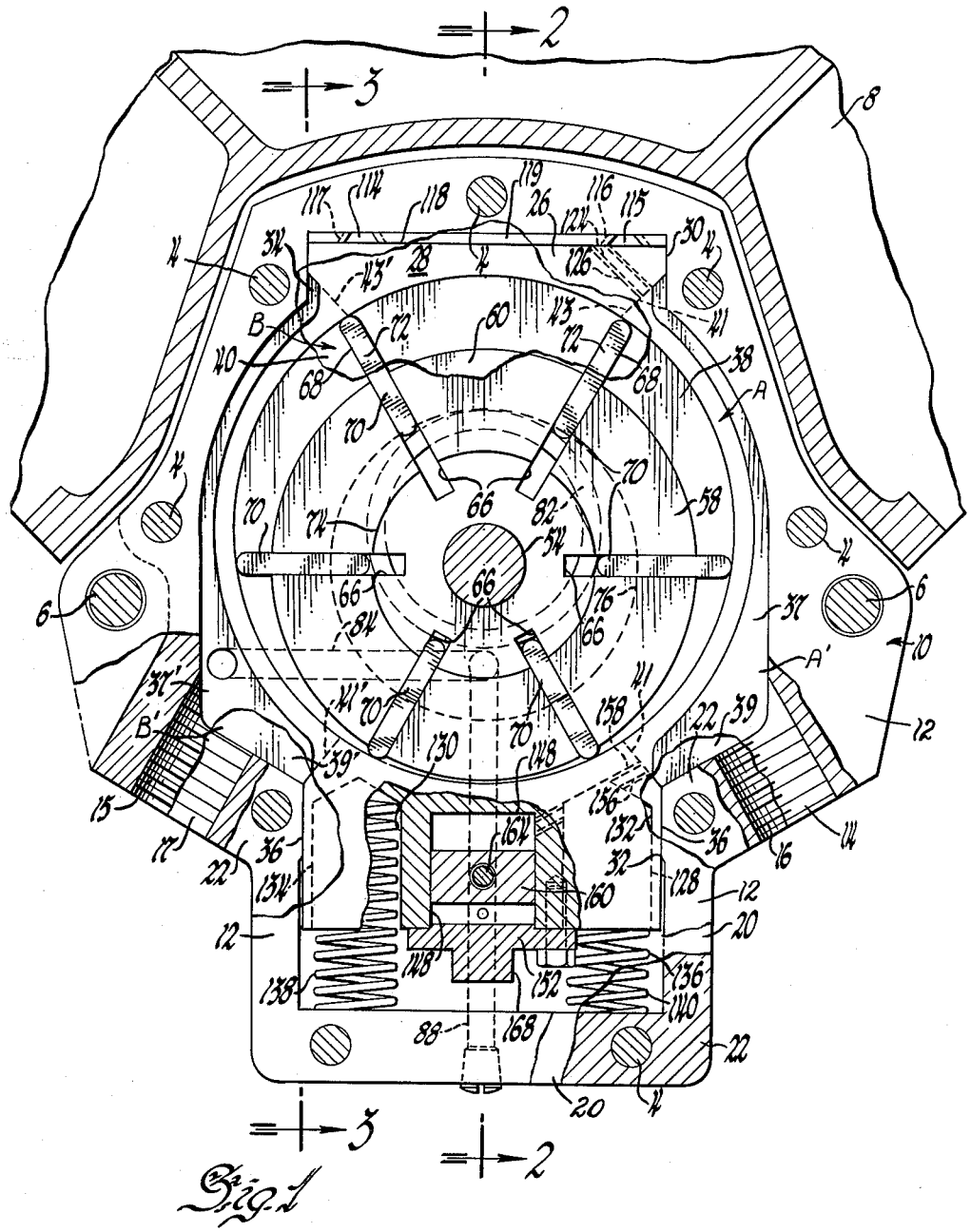
Figure 1 is a transverse sectional view taken substantially on the line 1—1 of Figure 2 with certain portions broken away to show the details of construction of one of the pumping units and with certain additional portions broken away and in section to show similar details of construction of the other pumping unit.
Figure 2:
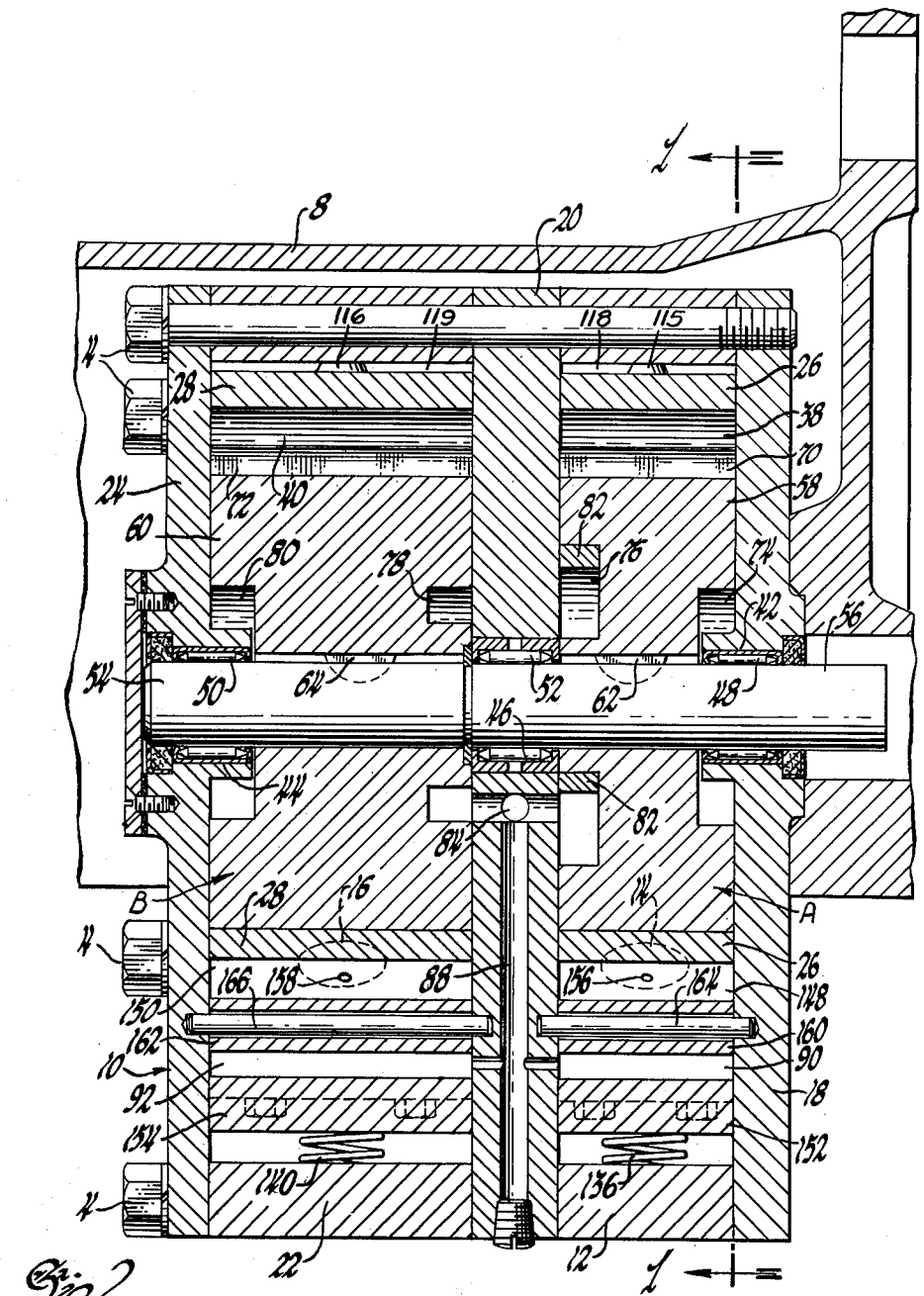
Figure 2 is a vertical sectional view taken substantially on the line 2—2 of Figure 1.
Figure 3:
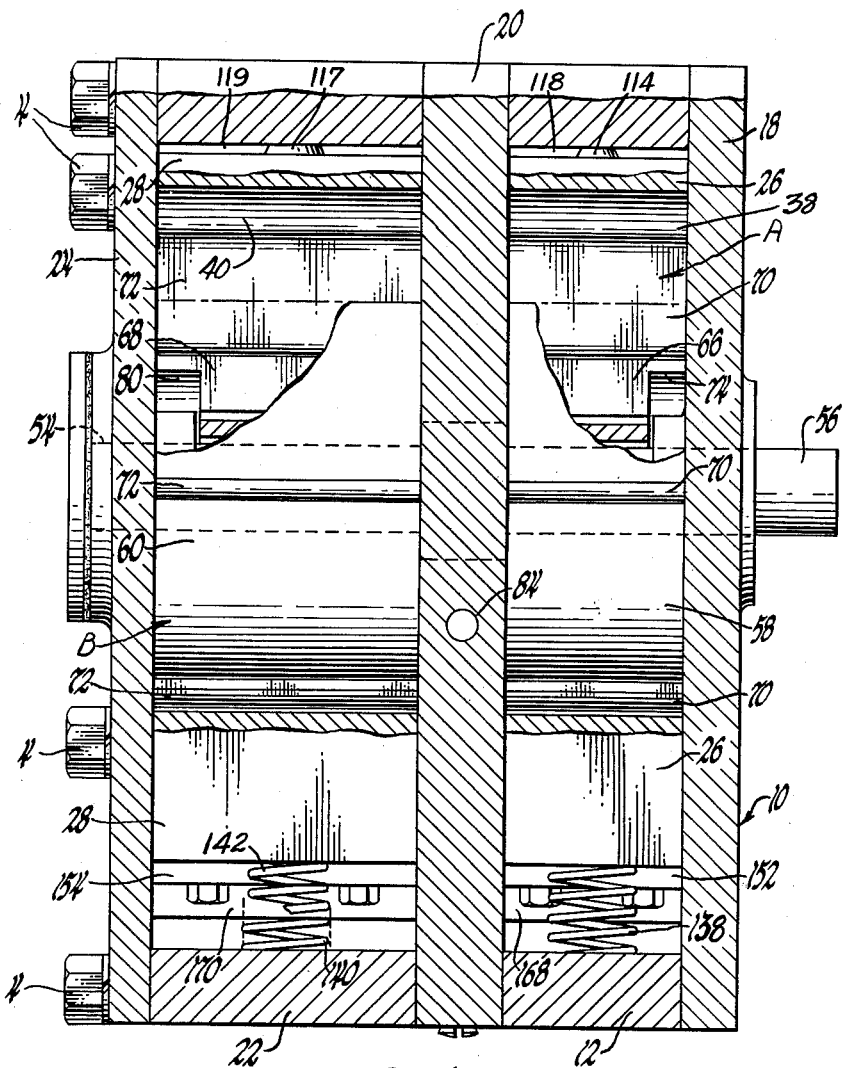
Figure 3 is a vertical sectional view taken substantially on the line 3—3 of Figure 1 with portions of the rotor and barrel broken away and in section.

Referring more particularly to the drawings, the pump mechanism includes a casing 10 which is secured by two stud bolts 6 to a dry-sump type internal combustion engine partially shown at 8. The casing comprises two body members 12 and 22, end cover plates 18 and 24, and a partition plate 20 secured together in fluid sealing relation by the stud bolts 4. The cover plates 18 and 24 and the partition plate 20 of the casing define the end walls of two pump mounting chambers A' and B' formed in juxtaposition within the body members 12 and 22 and in which two variable displacement vane-type rotary pumping units A and B, respectively, are mounted. The body members 12 and 22 are each provided with inlet openings 14 and 16 and outlet openings 15 and 17 for the chambers A' and B', respectively.

Two cylinder or barrel members 26 and 28 are reciprocably mounted in crosshead portions 30, 32 and 34, 36 formed in the body member 12 and 22, respectively. These barrel members 26 and 28 partition the pump mounting chambers A' and B' into inlet chambers 37 and 39, discharge outlet chambers 37' and 39', and cylindrical pump chambers 38 and 40 of the pumping units A and B, respectively. The members 26 and 28 are each circumferentially slotted to form oppositely disposed arcuate openings 41, 41' and 43, 43', respectively, each subtending an included angle of approximately 110° and providing inlets and outlets interconnecting the chambers 38 and 40, respectively, with the inlet and outlet chambers 37, 37' and 39, 39', respectively. The upper reciprocably mounted ends of the members 26 and 28 are each provided with two bosses 114, 115 and 116, 117 for maintaining clearance volumes 118 and 119, respectively, between the upper ends of these members and the body members. These clearance volumes 118 and 119 are connected to the inlet chambers 37 and 39 through passages 124 and 126 provided in the members 26 and 28, respectively.

At their lower ends engaging the crosshead portions 32 and 36, the barrel members 26 and 28 are each provided with two parallel bores 128, 130 and 132, 134, respectively. These bores serve to seat and guide the upper ends of helical springs 136, 138 and 140, 142 interposed between the barrel members 26 and 28 and the body members 12 and 22, respectively. These springs normally bias the members 26 and 28 toward their upper crossheads 30 and 34, respectively. Each of the lower portions of the members 26 and 28 are also provided with axially extending downwardly facing openings 148 and 150, respectively, formed intermediate of their spring-seating bores. The openings 148 and 150 are closed at their lower end by head members 152 and 154 and, in conjunction with the cover members 18 and 24 and the partition member 20, form chambers 90 and 92. Piston members 160 and 162 are mounted in the chambers 90 and 92, respectively, and are secured to the casing members by the pins 164 and 166. These piston members form expansible chambers between the pistons and members 26 and 28, respectively. The upper ends of the chambers 90 and 92 are each connected to the inlet chambers 37 and 39 of the pumps A and B, respectively, through passages 156 and 158 which also intersect the spring-seating bores 128 and 132, respectively. The chambers 90 and 92 are connected at their lower ends to the discharge chamber 37′ of pump A, as explained in greater detail below. This causes the discharge of pump A to act between the pistons 160 and 162 and members 26 and 28, respectively, thereby reciprocating the members 26 and 28 in their respective crossheads in opposition to the springs 136, 138 and 140, 142, respectively and in response to the pressure differential existing between the discharge pressure of pump A and the suction pressures of pumps A and B, respectively. The spring rates and the reaction surfaces of the pistons and chambers 90 and 92 are preferably proportioned so that the application of the discharge pressure of pump A results in the same degree of reciprocation for both members 26 and 28.

The end plates 18 and 24 and the partition plate 20 are coaxially perforated, as indicated at 42, 44, and 46 to provide seats for needle bearings 48, 50, and 52, respectively, journaling a drive shaft 54 common to both of the pump units A and B. The drive shaft 54 is adapted to be drivingly connected at one end 56 to the accessory driving system of the engine. Individual cylindrical rotors 58 and 60 of different axial dimension are coaxially perforated and keyed to the shaft 54, as indicated at 62 and 64, within the pump chambers 38 and 40, respectively. The rotors 58 and 60 are each provided with a plurality of axially extending radial slots 66 and 68 which reciprocably mount blades or vanes 70 and 72, respectively. These vanes are normally caused to reciprocate or work against the inner surfaces of the chambers 38 and 40, respectively, and form a plurality of expansible pumping chambers therewith. Adjacent their inner ends, the slots 66 and 68 interconnect circular recesses 74, 76 and 78, 80 formed coaxially of the shaft mounting bores in opposite end faces of the rotors 58 and 60, respectively. The recesses 74, 78 and 80 are in the form of counterbores and the recess 76 is in the form of an annular axially facing groove. A ring 82 mounted in the recess 76 positively engages the inner ends of the vanes 70 thereby causing the vanes 70 to reciprocate or work against the inner surface of the barrel member 26 as the rotor 58 is turned by the driving shaft 54 to insure priming of pump A when the engine is started. Since the rotor 60 is of greater axial dimension than the rotor 58, the capacity of pump B will be greater than that of pump A for any given operational positions of the members 26 and 28.

The partition plate 20 is provided with passages 84 and 88 interconnecting the discharge outlet chamber 37′ of pump A with the recesses 76 and 78 provided in the rotors 58 and 60, respectively, and with the chambers 90 and 92 formed in the members 26 and 28. The application of the discharge pressure to the recesses 76 and 78 and thereby to the slots 66 and 68 serves to maintain the vanes 70 and 72 of both pumping units in pumping engagement with their respective cylinder or barrel members 26 and 28.

The application of the discharge pressure of pump A to the chambers 90 and 92 causes the members 26 and 28 to vary the eccentricity of the pumping chambers 38 and 40 with respect to the axis of the rotors 58 and 60 and the rotor driving shaft 54 to thereby regulate the discharge pressure of the pump A substantially in accordance with the speed of the engine-driven shaft 54 and to vary the displacement of pump B in accordance with the displacement of pump A. Thus when either speed of the shaft 54 increases, or the lubrication requirements of the engine decrease, the resultant momentary increase in the discharge pressure results in a reduced eccentricity of the pumping chambers with a consequential reduction of the displacement or pumping capacity of each pump until new balances are achieved between the discharge pressure as applied to the chambers 90 and 92 and the springs 136, 138 and 140, 142, respectively, which tend to bias the cylinder members 26 and 28, respectively, toward their maximum displacement locations. Each of the heads 152 and 154 may have bosses 168 and 170 formed thereon to limit the movement of the members 26 and 28 in a minimum displacement direction.

From the foregoing description, the application of the described embodiment of the invention as a combined lubrication supply and scavenging pump to a dry-sump engine will be obvious to those skilled in the art. However, in the interest of clarity and completeness, the operation of the described embodiment in such an application is briefly detailed below.

Assuming the engine to which the pumping mechanism is applied to be in a shutdown condition, the springs 136, 138 and 140, 142 will bias the members 26 and 28 to their maximum displacement positions with the bosses 114, 115 and 116, 117 in abutment with the body members 12 and 22, respectively. Since there is no pressure in the discharge chamber 37′ of pump A, the vanes of pump B will not be maintained in working engagement with the inner surface of member 28. As a consequence, pump B will be unloaded during the initial engine starting period. However, the ring 82 insures that the vanes 70 of pump A are maintained in pumping contact with the inner surface of the member 26 irrespective of the discharge pressure of pump A. Therefore, simultaneously with engine starting, the pump A will supply lubricant to the various engine parts to be lubricated through suitable connections secured to the outlet 15. When the discharge pressure in the chamber 37′ has achieved a value sufficient for supplying lubricant to the engine parts, this discharge pressure acting through the passage 84, the recess 78, and the slots 68 will urge the vanes 72 of the pump B into pumping engagement with the member 28 thereby causing the pump B to scavenge the dry-sump of the engine. The rates of the springs 136, 138 and 140, 142 are such that the barrel members 26 and 28 will be maintained in their maximum displacement positions at normal engine idle speeds.

As engine speed and therefore the speeds of the shaft 54 and the rotors 58 and 60 are increased, the discharge pressure of pump A, as applied to the chambers 90 and 92, will act between the pistons 160 and 162 and the heads 152 and 154, respectively, causing the members 26 and 28 to move in opposition to the biasing springs until equilibrium is achieved between the fluid and spring pressures reacting between the piston, the casing, and the barrel members. Still further increases in engine speed with resultant variations in the engine lubrication demands will produce a similar shifting of the barrel members until a new condition of equilibrium is achieved. Similarly, reductions in engine speed with resultant variations in the engine lubrication demands, and therefore in the discharge pressure of pump A, will result in an increase in pump displacement until equilibrium conditions are again achieved. Thus, it will be seen that the discharge pressure of pump A is utilized to regulate the eccentricity of the barrel member 26 and thereby the pumping capacity of pump A to maintain the desired lubricating supply pressure.

Since the displacement of the scavenging pump is also regulated in accordance with the discharge pressure of pump A, the nominal ratio of volumetric discharge between the scavenge and pressure pump is maintained throughout the operational speed range of the engine. This is a highly desirable result in that it prevents extreme conditions in which starvation of the scavenging pump or flooding of the sump might occur and serves to minimize the aeration or foaming of the oil being returned to the reservoir.

While the foregoing description and figures have been confined to one embodiment, it will be apparent to those skilled in the art that numerous modifications may be made without departing from the spirit thereof. Accordingly, it is to be understood that the foregoing is to be considered as illustrative only and in no way restrictive, reference being made to the appended claims to determine the scope of the invention.

I claim:

1. A fluid transmitting device comprising, in combination, a casing having two chambers therein, a driving shaft rotatably mounted in said casing and extending through said chambers, a variable displacement vane-type rotary pump mounted within each of said chambers and including a rotor body mounted on said driving shaft, a cylinder mounted within its respective casing chamber for movement transversely of the axis of said shaft between a maximum displacement position and a minimum displacement position, and a plurality of vanes reciprocably mounted in said rotor body and working against said cylinder to divide each pump into a plurality of pumping compartments, said casing and each of said cylinders defining an inlet passage and an outlet passage for each of said pumps, spring means interposed between said casing and each of said cylinders to normally bias said cylinders toward one of their extreme positions, said casing and each of said cylinders defining expansible chamber means therebetween connected to the outlet passage of the same one of said pumps and operable in response to the discharge pressure of said same one pump to shift each of said cylinders toward the other of said extreme positions in opposition to said biasing spring means thereby varying the relative pumping displacement of each pump proportionally with respect to the other of said pumps, and said casing and each of said cylinders defining secondary expansible chamber means therebetween, each of said secondary expansible chamber means being connected to the inlet passage of its respective pump.

2. A fluid transmitting device comprising, in combination, a casing having two chambers therein, a driving shaft rotatably mounted in said casing and extending through said chambers, a cylinder member mounted within each of said casing chambers and defining a pumping chamber therein movable between a maximum displacement position and a minimum displacement position, impeller means mounted on said driving shaft within each of said chambers and cooperating with the pumping chamber defined by said cylinder member, spring means interposed between said casing and each of said cylinders to normally bias said cylinders toward one of their extreme positions, and said casing and each of said cylinder members defining an inlet passage and an outlet passage for each of said pumps, said casing and each of said cylinders defining several primary expansible chamber means therebetween, each of said primary expansible chamber means being connected to the outlet passage of the same one of said pumps and operable in response to the discharge pressure of said same one pump to shift each of said cylinders toward the other of said extreme positions in opposition to said biasing spring means thereby varying the relative pumping displacement of each pump proportionally with respect to the other of said pumps, and said casing and each of said cylinders defining several secondary expansible chamber means therebetween, each of said secondary expansible chamber means having a restricted connection with the inlet passage of one of said pumps and being operable to retard movement of said cylinder members by said biasing means and said primary expansible chamber means.

3. A hydraulic pumping mechanism comprising a casing having a plurality of chambers formed therein, a variable displacement rotary pump mounted in each of said pumping chambers and including a rotor adapted to be simpltaneously driven with the other of said rotors, a cylinder barrel mounted in each of said casings and defining a pumping chamber therewith movable to vary the pumping displacement of each of said pumps, said rotor and said barrel cooperating to define a plurality of variable displacement pumping compartments, biasing means associated with each of said cylinder barrels and normally biasing each of said barrels in an increasing displacement direction, said casing and each of said cylinder barrels defining an inlet passage and an outlet passage for each of said pump units, said casing and each of said cylinder barrels further defining a plurality of primary expansible chamber means therebetween, each of said primary expansible chamber means being operable to adjust the eccentricity of its associated cylinder barrel with respect to the axis of the rotor in opposition to said biasing means, and passage means interconnecting said expansible chamber means to the outlet passage of the same one of said pumps whereby said piston means are rendered responsive to the discharge pressure of said same one pump unit to vary the relative pumping displacement of each of said pumps with respect to the other of said pumps in accordance with the pressurized fluid demand on said same one pump, and said casing and each of said cylinder barrels defining a plurality of secondary expansible chamber means therebetween, each of said secondary expansible chamber means being operable to retard movement of its associated cylinder barrel by said biasing means and said primary expansible chamber means and including a restricted connection to the inlet passage of its associated pump.

4. A hydraulic pumping mechanism comprising a casing having a plurality of pumping chambers formed in juxtaposition therein, a plurality of variable displacement rotary pump units, each of said pump units being mounted in one of said pumping chambers and including a rotor mounted on a driving shaft which is common to said other pump units and adapted to simultaneously drive all of said rotors, a cylinder barrel spacedly embracing said rotor and mounted in said casing for movement relative to said rotors and said shaft to vary the pumping displacement of each of said pumps, and means interposed between said rotor and said barrel and dividing each pump unit into a plurality of expansible chamber pumping compartments, said casing and each of said cylinder barrels defining an inlet passage and an outlet passage for each of said pump units, biasing means associated with each of said cylinder barrels and normally biasing each of said barrels in an increasing displacement direction, and a plurality of expansible chamber piston means formed intermediate said casing and each of said cylinder barrels and operable to adjust the eccentricity of each of said barrels with respect to the axis of the rotor in opposition to said biasing means, and passage means interconnecting each of said piston means to the outlet passage of the same one of said pumps whereby said piston means are rendered responsive to the discharge pressure of said same one pump unit to vary the relative pumping displacement of each unit with respect to the other of said pump units in accordance with the pressurized fluid demand on said same one pump.

5. A hydraulic pumping mechanism comprising a casing, two variable displacement rotary pump units arranged in juxtaposition within said casing, each of said pump units including a rotor mounted on a driving shaft which is common to said other pump unit and adapted to simultaneously drive said rotors, a cylinder barrel spacedly embracing said rotor and reciprocably mounted in said casing for movement transversely of the axis of said rotor and said shaft to vary the pumping displacement of its respective pump between a maximum displacement position and a minimum displacement position, and means interposed between said rotor and said barrel for dividing each pump unit into a plurality of expansible chamber pumping compartments, biasing means associated with each of said cylinder barrels and normally biasing each of said barrels in an increasing displacement direction toward its maximum displacement position, and each of said pump units including fluid pressure responsive means having communication with and operable in response to the discharge pressure of the same one of said pump units to adjust the eccentricity of each of said barrels with respect to the axis of the rotor in opposition to said biasing means thereby varying the relative pumping displacement of each unit with respect to the other of said pump units in accordance with the pressurized fluid demand on said same one pump.

6. In combination with a dry-sump internal combustion engine, a combined pump mechanism comprising a lubricant-supplying variable displacement vane-type rotary pump unit, a dry-sump-scavenging variable displacement vane-type rotary pump unit, each of said pump units including a rotor body, a pump barrel, means for mounting said cylinder barrel for movement transversely of the axis of the rotor body, and a plurality of vanes reciprocably mounted in said rotor body, and means for biasing said vanes outwardly against said barrel to divide each pump unit into a plurality of pumping compartments, drive means common to both of said pump units and adapted to simultaneously drive said rotor bodies in accordance with engine speed, and each of said pump units including fluid pressure operable means having fluid connection with and operable in response to the discharge pressure of said lubricant-supplying pump unit to adjust the eccentricity of each of said barrels with respect to the axes of the rotor bodies thereby regulating the volumetric pumping capacity of each pump unit in accordance with engine speed variable lubrication demands of the engine and in a substantially fixed ratio with respect to the other pump unit.

7. In a lubricating system for an internal combustion engine having a dry sump, a pump mechanism comprising, in combination, a lubricant-supplying variable displacement expansible chamber pump, a dry-sump-scavenging variable displacement expansible chamber pump, drive means common to each of said pumps and adapted to simultaneously operate said pumps in accordance with engine speed, and each of said pumps including means for varying displacement of its respective pump unit, said displacement varying means for each pump unit including fluid pressure operable means having communication with and operable to adjust said displacement varying means in response to the discharge pressure of said lubricant-supplying pump to maintain a scheduled regulation of the pumping displacement of each pump in accordance with the engine speed variable lubrication demands of the engine.

8. In an internal combustion engine having a dry sump, a combined pump mechanism comprising, in combination, a first variable displacement pump means for supplying pressurized lubricant to said engine, a second variable displacement pump means for scavenging the dry sump of said engine, the displacement of said second pump means being larger than that of said first pump means to accommodate aeration of the lubricant being scavenged by said second pump means, drive means common to and adapted to simultaneously drive said first and second pump means at a predetermined ratio with respect to engine speed, and each of said pump means including means responsive to the discharge pressure of said lubricant-supplying pump unit for regulating the volumetric pumping capacity of said first pump means to provide the speed variable lubrication demands of the engine and of said second pump means in a substantially fixed ratio with respect to said first pump means, each of said regulating means including a member movable between a maximum displacement regulating position and a minimum displacement regulating position, resilient means normally biasing each of said members toward their maximum displacement regulating positions, primary expansible chamber means responsive to the discharge pressure of said first pump means and operable to shift each of said displacement regulating members toward their minimum displacement positions in opposition to said resilient biasing means thereby varying the relative pumping displacement of each pump means proportionally with respect to the other of said pump means, and secondary expansible chamber means operable to damp the pressure-responsive movement of each of said members thereby minimizing the effect of pressure pulsations acting on said primary expansible chamber means.

9. In combination with an internal combustion engine having a dry sump, a lubricant pump comprising, in combination, a first variable displacement pump unit operable to supply pressurized lubricant to the engine, a second variable displacement pump unit operable to scavenge the dry sump of the engine, each of said pump units including a rotor body, a cylinder member defining a cylindrical pump chamber spacedly and eccentrically embracing its rotor body and mounted for movement transversely of the axis of the rotor body to vary the eccentricity of said pump chamber with respect to the rotor axis between maximum and minimum displacement positions, and a plurality of vanes reciprocably mounted in each rotor body for movement in sealing engagement with the chamber-defining surfaces of each of said cylinder members thereby dividing each of said eccentric pump chambers into a plurality of expansible pumping compartments, means drivingly connecting the rotors of both of said pump units to said engine and adapted to drive each of said rotor bodies at speeds proportional to the engine speed, a ring thrustably engaging and maintaining the vanes of said first pump unit in pumping relation with the chamber-defining surfaces of the first-pump cylinder member, fluid pressure means operable in response to the discharge pressure of said one of said pump units to urge the vanes of both said first and second pump units into pumping engagement with the chamber-defining surfaces of their respective pump units, resilient means biasing each of said cylinder members toward their maximum displacement position, fluid pressure means operable in response to the lubricant pressure supplied to said engine to shift said cylinder members toward their minimum displacement positions thereby adjusting the eccentricity of each of said pump chambers with respect to the axis of its rotor in opposition to the resilient biasing means thereby regulating the volumetric pumping capacity of each pump unit in a substantially fixed ratio with respect to each other and in accordance with the lubrication demands of the engine which vary in accordance with engine speed, and means for damping the pressure responsive movement of each of said cylinder members by said fluid pressure means thereby minimizing the displacement-varying effect of pressure pulsations in the lubricant supplied by said first pump.

10. In combination with an internal combustion engine, a variable displacement pump unit operable to supply pressurized lubricant to the engine and comprising a rotor, means defining a cylindrical pump chamber spacedly embracing said rotor and including a member mounted for movement varying the eccentricity of the pump chamber with respect to the rotor axis between maximum and minimum displacement positions, a plurality of vanes reciprocably mounted in the rotor body for movement in sealing engagement with the surfaces defining said eccentric pump chamber and dividing said chamber into a plurality of expansible pumping compartments, means drivingly connecting said rotor to said engine to drive said rotor and said vanes therewith at a speed proportional to the engine speed, a ring thrustably engaging and tending to maintain said vanes in pumping relation with the pump-chamber-defining surfaces of said member and fluid pressure means coacting with said ring on said vanes to maintain said vanes in pumping engagement with the pump-chamber-defining surfaces of said member, resilient means biasing said cylinder member toward its maximum displacement position, fluid pressure means operable in response to the lubricant pressure supplied to said engine to shift said cylinder member toward its minimum displacement position thereby adjusting the eccentricity of said pump chamber with respect to the axis of its rotor in opposition to the resilient biasing means whereby the volumetric pumping capacity of said pump unit is regulated in accordance with the lubrication demands of the engine which vary as a function of engine speed, said resilient means being prestressed to maintain said member in its maximum displacement position until a minimum lubricant supply pressure for safe engine operation at engine idle speed is obtained and having a resilient deflection rate whereby deflection of said resilient means by said member upon movement between its maximum and minimum displacement positions progressively increases the pressure and flow of lubricant supplied to said engine with engine speed up to a maximum pressure corresponding to that required for proper engine cooling and lubrication under maximum safe engine operating speed and load conditions.

11. In the combination set forth in claim 10, means for damping the pressure responsive movement of said member by said displacement-varying fluid pressure means thereby minimizing the displacement varying effect of pressure pulsations in the lubricant supplied to said engine.

12. In combination with an internal combustion engine, a variable displacement pump unit operable to supply pressurized lubricant to the engine and including a member shiftable between maximum and minimum displacement control positions, resilient means biasing said member toward its maximum displacement control position, fluid pressure means operable in response to the lubricant pressure supplied to said engine to shift said member toward its minimum displacement control position in opposition to the resilient biasing means thereby regulating the supplied lubricant pressure and the volumetric pumping capacity of the pump unit in accordance with the lubrication demands of the engine which vary as a function of engine speed, said resilient means being prestressed to maintain said member in its maximum displacement position until a minimum lubricant supply pressure for safe engine operation at engine idle speed is obtained and having a resilient deflection rate whereby deflection of said resilient means by said member upon movement between its maximum and minimum displacement positions progressively increases the pressure and flow of lubricant supplied to said engine in accordance with increasing engine speed up to a maximum pressure corresponding to that required for proper engine cooling and lubrication under maximum safe engine operating speed and load conditions.

13. In combination with an internal combustion engine having a dry sump, a combined pump mechanism comprising a first variable displacement pump means for supplying pressurized lubricant to said engine, a second variable displacement pump means for scavenging the dry sump of said engine, the displacement of said second pump means being larger than that of said first pump means to accommodate aeration of the lubricant being scavenged by said second pump means, drive means common to and adapted to drive said first and second pump means at a predetermined ratio with respect to engine speed, and said pump means including means responsive to the discharge pressure of said lubricant-supplying pump unit for regulating the volumetric pumping capacity of said first pump means to provide the speed variable lubrication demands of the engine and of said second pump in a substantially fixed ratio with respect to that of said first pump means, said regulating means including a member movable between a maximum displacement regulating position and a minimum displacement regulating position, resilient means normally biasing said member toward its maximum displacement regulating position, and expansible chamber means in communication with and operable in response to the lubricant pressure supplied to said engine from said first pump means to shift said displacement regulating member toward its minimum displacement position in opposition to said resilient biasing means, said resilient means being prestressed to maintain said displacement regulating member in its maximum displacement regulating position until a minimum lubricant supply pressure for safe engine operation at engine idle speed is supplied by said first pump means and having a resilient deflection rate whereby deflection of said resilient means by said member upon movement between its maximum and minimum displacement regulating position progressively increases the pressure and flow of lubricant supplied to said engine from said first pump means in accordance with increasing engine speed to a maximum pressure and flow corresponding to that required for proper cooling and lubrication of the engine at the maximum safe engine operating speed and load condition and progressively increases the proportionate lubricant flow through said second pump means in ratio thereto.

14. In combination with an internal combustion engine having a dry sump, a combined pump mechanism comprising a first variable displacement pump means for supplying pressurized lubricant to said engine, a second variable displacement pump means for scavenging the dry sump of said engine, the displacement of said second pump means being proportionately larger than that of said first pump means to accommodate aeration of the lubricant being scavenged by said second pump means, drive means common to and adapted to simultaneously drive said first and second pump means at a predetermined fixed ratio with respect to engine speed, and each of said pump means including a means responsive to the discharge pressure of said lubricant-supplying pump unit for regulating the volumetric pumping capacity of its respective pump means to provide the speed variable lubrication demands of the engine from said first pump and to vary the displacement of said second pump as a proportionate function of that of said first pump means, each of said regulating means including a member movable between a maximum displacement regulating position and a minimum displacement regulating position, resilient means normally biasing each of said members toward their maximum displacement regulating positions, and expansible chamber means in communication with and operable in response to the lubricant pressure supplied to said engine from said first pump means to shift each of said displacement regulating members toward their minimum displacement positions in opposition to said resilient biasing means, said resilient means each being prestressed to maintain their respective displacement regulating members in their maximum displacement positions until a minimum lubricant supply pressure for safe engine operation at engine idle speed is obtained from said first pump means and having a resilient deflection rate whereby deflection of said resilient means by said members upon movement between their maximum and minimum displacement positions progressively increases the pressure and flow of lubricant supplied to said engine from said first pump means in accordance with increasing engine speed to a maximum pressure and flow corresponding to that required for proper cooling and lubrication of the engine at the maximum safe engine operating speed and load condition and progressively increases the proportionate lubricant flow through said scavenging pump means.

15. In combination with an internal combustion engine, a variable displacement pump unit operable to supply pressurized lubricant to the engine and including means drivingly connecting said pump to said engine to drive said pump at a speed proportional to the engine speed, a member mounted for movement varying the displacement of the pump between maximum and minimum displacement control positions, resilient means biasing said member toward its maximum displacement control position, fluid pressure means operable in response to the lubricant pressure supplied to said engine to shift said member toward its minimum displacement position thereby adjusting the displacement of said pump in opposition to the resilient biasing means thereby regulating the volumetric pumping capacity of said pump unit in accordance with the lubrication demands of the engine which vary as a function of engine speed, said resilient means being prestressed to maintain said member in its maximum displacement position until a minimum lubricant supply pressure for safe engine operation at engine idle speed is obtained and having a resilient deflection rate whereby deflection of said resilient means by said member upon movement between its maximum and minimum displacement positions progressively increases the pressure and flow of lubricant supplied to said engine in accordance with increasing engine speed to a maximum pressure corresponding to that required for proper cooling and lubrication of the engine at the maximum safe engine operating speed, and means for damping the pressure responsive movement of said member by said fluid pressure means thereby minimizing the displacement varying effect of pressure pulsations in the lubricant supplied by said pump.

16. In a variable displacement pump unit operable to supply pressurized fluid to an associated device requiring progressively increasing pressure and fluid flow thereto in accordance with variations of an operating condition thereof, a rotor, means defining a cylindrical pump chamber spacedly embracing said rotor and including a member mounted for movement to vary the eccentricity of the pump chamber with respect to the rotor axis between maximum and minimum displacement positions, a plurality of vanes reciprocably mounted in the rotor for movement in pumping engagement with the surfaces defining said eccentric pump chamber and dividing said chamber into a plurality of expansible pumping compartments, means for driving said rotor at speeds varying in accordance with said operating condition, means for maintaining said vanes in pumping engagement with the pump-chamber-defining surfaces of said member, resilient means biasing said member toward its maximum displacement position, fluid pressure means operable in response to pressurized fluid supplied thereto to shift said member toward its minimum displacement position thereby adjusting the eccentricity of said pump chamber with respect to the axis of its rotor in opposition to the resilient biasing means, passage means connecting said fluid pressure means to the pressurized fluid supplied by said pump thereby regulating the volumetric pumping capacity of said pump unit in accordance with the rotor-driving speed and the pressurized fluid demands of said device which vary as functions of said operating condition, said resilient means being prestressed to maintain said member in its maximum displacement position until a minimum fluid supply pressure at minimum rotor speed is obtained and having a resilient deflection rate whereby deflection of said resilient means by said member upon movement between its maximum and minimum displacement positions progressively increases the pressure of fluid supplied to said device in accordance with variations in said operating condition and corresponding increases in the rotor-driving speed up to a maximum pressure at the maximum rotor driving speed, and means for damping the pressure responsive movement of said member by said fluid pressure means thereby minimizing the displacement varying effect of pressure pulsations in the lubricant supplied by said pump.

References Cited in the file of this patent

UNITED STATES PATENTS

| | | |
|---|---|---|
| 550,466 | Westinghouse | Nov. 26, 1895 |
| 2,031,749 | Vincent | Feb. 25, 1936 |
| 2,420,155 | Tucker | May 6, 1947 |
| 2,523,214 | Ifield | Sept. 19, 1950 |
| 2,612,114 | Ernst | Sept. 30, 1952 |
| 2,638,973 | Carey | May 19, 1953 |
| 2,685,255 | Carner | Aug. 3, 1954 |
| 2,764,941 | Miller et al. | Oct. 2, 1956 |

FOREIGN PATENTS

| | | |
|---|---|---|
| 111,841 | Switzerland | Sept. 16, 1925 |
| 489,955 | Great Britain | Aug. 5, 1938 |
| 988,511 | France | May 9, 1951 |

UNITED STATES PATENT OFFICE
CERTIFICATE OF CORRECTION

Patent No. 2,981,371  
April 25, 1961

Earl R. Pierce

It is hereby certified that error appears in the above numbered patent requiring correction and that the said Letters Patent should read as corrected below.

Column 6, line 32, for "piston" read -- primary expansible chamber --.

Signed and sealed this 19th day of September 1961.

(SEAL)  
Attest:

ERNEST W. SWIDER  
Attesting Officer

DAVID L. LADD  
Commissioner of Patents  
USCOMM-DC